(12) United States Patent
Tseng et al.

(10) Patent No.: US 6,433,826 B1
(45) Date of Patent: Aug. 13, 2002

(54) ADJUSTING MECHANISM FOR THE LENS SET OF AN IMAGING SYSTEM

(75) Inventors: Kou-Long Tseng; Chien-Chin Chan, both of Hsinchu; Guang-Shang Chang, Taichung; Chin-Shui Lin, YungHo; Chih-Wen Pan, Taipei; Chi-Wen Lin, Hsinchu, all of (TW)

(73) Assignee: Umax Data System Inc., Hsinchu (TW)

( * ) Notice: Subject to any disclaimer, the term of this patent is extended or adjusted under 35 U.S.C. 154(b) by 0 days.

(21) Appl. No.: 09/048,959

(22) Filed: Mar. 26, 1998

(51) Int. Cl.[7] .................. H04N 7/14; H04N 5/225; G02B 7/02
(52) U.S. Cl. .................. 348/373; 348/14; 359/822
(58) Field of Search .................. 348/373, 375, 348/340, 211, 214, 335, 142, 14.03, 14.08, 552, 98–100; 359/822, 824, 813

(56) References Cited

U.S. PATENT DOCUMENTS

| | | | | |
|---|---|---|---|---|
| 5,550,754 A | * | 8/1996 | McNelly et al. | 348/14 |
| 5,719,622 A | * | 2/1998 | Conway | 348/211 |
| 5,734,414 A | * | 3/1998 | Nishimura et al. | 348/14 |
| 5,808,679 A | * | 9/1998 | Shih | 348/335 |
| 5,825,408 A | * | 10/1998 | Yuyama et al. | 348/14 |
| 5,903,706 A | * | 5/1999 | Wakabayashi et al. | 386/117 |
| 6,091,453 A | * | 7/2000 | Coan et al. | 348/373 |
| 6,115,068 A | * | 9/2000 | Ariga et al. | 348/373 |
| 6,226,448 B1 | * | 5/2001 | Takagi et al. | 348/373 |

* cited by examiner

Primary Examiner—Wendy R. Garber
Assistant Examiner—Rashawn N. Tillery
(74) Attorney, Agent, or Firm—W. Wayne Liauh

(57) ABSTRACT

An adjusting mechanism for the lens set of an imaging system, which is applied to digital photo-taking system, monitoring system, and the like for precisely adjusting the lens set thereon, comprising a pivoting means located inside the imaging system for providing rotation capability to the lens set having the rotation center located at the pivoting means and close to the anchoring end of the lens set; a driving means, located inside the imaging system, for driving the lens set to rotate around the pivoting means; and a human-machine interface for facilitating the operator to control the driving means indirectly.

19 Claims, 3 Drawing Sheets

ADJUSTING MECHANISM FOR THE LENS SET OF AN IMAGING SYSTEM

BACKGROUND OF THE INVENTION (1) Field of the Invention

The invention relates to an adjusting mechanism for the lens set of an imaging system, and more particularly to which is built in a digital imaging system to carry out the view-direction adjustment of the lens set.

(2) Description of the Prior Art

Conventional digital camera such as one disclosed in U.S. Pat. No. 5,612,732 has its lens set movable about a single axis. Thus, a single degree of freedom for the lens set is obtained in the work. As an improvement over the preceding work, another prior art disclosed in ROC Pat. Publication No. 286783 (Application No. 85201588) introduces a lens set which is capable of limited sliding and rotation. However, both of aforesaid prior arts have to use bare hands to turn the lens for any adjusting intend. Moreover, they have the following common disadvantages.

1. The lens may be smeared easily during adjusting, and which will lead to poor photo quality.
2. Adjusting by hand s is usually not precise, but rough and rude. Such movement could not only cause possible damage at the lens structure, but also contribute to unexpected internal movement inside the camera housing. As a consequence, degradation in lens focusing and camera durability might be inevitable.

Because of these drawbacks, digital camera is usually ranged to relatively low precision requirement products, and is not adaptable to high-end products which usually demand high degree of lens cleanness and more precise focusing.

Therefore, an invention devoting to resolving aforesaid disadvantages of conventional adjusting mechanism for the lens set of an imaging system is necessary, definitely.

SUMMARY OF THE INVENTION

Accordingly, it is a primary object of the present invention to provide an adjusting mechanism for the lens set of an imaging system, which will make broader its photo-taking range by utilizing universal ball joints.

It is another object of the present invention to provide an adjusting mechanism for the lens set of an imaging system, which makes the lens precisely adjustable by applying separate X- and Y-axis driving units.

It is a further object of the present invention to provide an adjusting mechanism for the lens set of an imaging system, which can avoid direct hand contact on the lens and reduce the possibility of lens damage by employing a human-machine interface.

The adjusting mechanism for the lens set of an imaging system in accordance with the present invention, which is applied to digital photo-taking system, monitoring system, and the like for precisely adjusting the lens set thereon, comprises a pivoting means, a driving means for controlling the lens set, and a human-machine interface for controlling the driving means. By the pivoting means and the driving means, the lens set of the imaging system according to the present invention, then, can obtain a cone-shape accessible region of the lens set, with the cone tip located inside the imaging system.

According to the invention, the pivoting means, which is connected to the anchoring end of the lens set inside the imaging system and provides three rotational degrees of freedom to the anchoring end, can be a ball joint, a universal joint, or any as the like. Preferably, the pivoting means is a ball joint comprising a ball housing fixedly located to the imaging system and a ball-shape terminal, which is connected with the anchoring end of the lens set and is restricted and limited rotationable inside the ball housing. In case that the pivoting means is a universal joint, one of the terminal of the universal joint is connected fixedly to the imaging system, and the other terminal connected with the anchoring end of the lens set.

According to the present invention, the driving means located inside the imaging system is utilized to drive the lens set rotating inside the cone-shape accessible region with the pivoting means as the rotation center. Preferably in the first embodiment according to the present invention, the driving means further comprises a first electromagnetic-controlled element and a second electromagnetic-controlled element.

The first connecting arm of the first electromagnetic-controlled element as the output of the first electromagnetic-controlled element, which is a flexible arm with its protruding length controlled by the first electromagnetic-controlled element, can be a two-section arm with two sections universally jointed in the middle of the arm, with one end connected with the first electromagnetic-controlled element and with the other end ball jointed to the middle of the lens set.

Similar to the structure described in the first electromagnetic-controlled element, the second electromagnetic-controlled element according to the present invention has a two-section second connecting arm. However, the installation of the second electromagnetic-controlled element and the second connecting arm is not parallel to, or along the same line with, the installation of the first electromagnetic-controlled element and the first connecting arm. Such arrangement of the driving means can make the lens set X- and Y-axis adjustable.

In the second embodiment according to the present invention, the driving means comprises a first gear-and-rack set and a second gear-and-rack set. The gear of the first gear-and-rack set is driven by an electrical motor, and the rack engaged with the gear is ball jointed to middle of the lens set by a ball joint located at one end of the rack.

Similar to the structure described in the first gear-and-rack set, the second gear-and-rack set according to the second embodiment has a gear driven by another electrical motor and a rack engaged with the gear and ball jointed to middle of the lens set by a ball joint located at one end of the rack. However, the installation of the second gear-and-rack set not parallel to, or along the same line with, the installation of the first gear-and-rack set. Such arrangement of the driving means can make the lens set X- and Y-axis adjustable.

In the third embodiment according to the present invention, the driving means comprises a carrier and a third gear-and-rack set. The carrier driven by an electrical motor is a rotational platform for bearing the pivoting means and the third gear-and-rack set. The third gear-and-rack set further comprises a gear driven by another motor and a rack engaged with the gear at one side and ball jointed to middle of the lens set at the other end. The arrangement of the third gear-and-rack set can't be perpendicular to the rotation axis of the carrier so that the lens set can be X- and Y-axis adjustable by the third embodiment of the driving means.

The human-machine interface according to the present invention is a means for facilitating the operator to control the driving means indirectly. Preferably, the human-machine interface is a displacement-sensing means, and further comprises a rotation ball and a sensing unit. The rotation ball is utilized to generated angular displacement by human activation. The sensing unit located around the rotation ball is used for detecting the angular displacement of the rotation ball and for providing a status signal to control the driving means, and further comprises preferably an X-axis sensor, a Y-axis sensor, and a reference sensor for supplying reference status signal. By providing these three sensors, the angular displacement of the rotation ball can be observed accurately and can be used to activate the driving means.

In another embodiment according to the present invention, a hand control means can be used to replace the driving means and the human-machine interface for controlling motion of the lens set. The hand control means can be a four-bar linkage to control the positioning of the lens set directly, and no need of any electrical motor in the adjusting means is necessary.

According to the present invention, the four-bar linkage can be an a planar rectangular linkage installed inside the imaging system, with the input bar accessible to the foreign control activation (hand motion, for example) and the extended output bar connected with the lens set via a sliding track means. The sliding track means comprises a slider ball jointed to the output bar of the four-bar linkage, and a track located on the circumference of the lens set and along the longitudinal direction of the lens set to accept the slider. Preferably, the plane where the four-bar linkage locates is perpendicular to the center line of the cone-shape accessible region of the lens set. By providing the four-bar linkage, the sliding track means at end of the output bar and the pivoting means, the lens set in accordance with the present invention can be easily adjusted anywhere in the cone-shape accessible region.

According to the present invention, aforesaid ball joints can be replaced with universal joints or any as the like; similarly, aforesaid universal joints can be substituted by ball joints or the like.

All these objects are achieved by the adjusting mechanism for the lens set of an imaging system described below.

BRIEF DESCRIPTION OF THE DRAWINGS

The present invention will now be specified with reference to its preferred embodiments illustrated in the drawings, in which.

DESCRIPTION OF THE PREFERRED EMBODIMENT

The invention disclosed herein is directed to an adjusting mechanism for the lens set of an imaging system. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
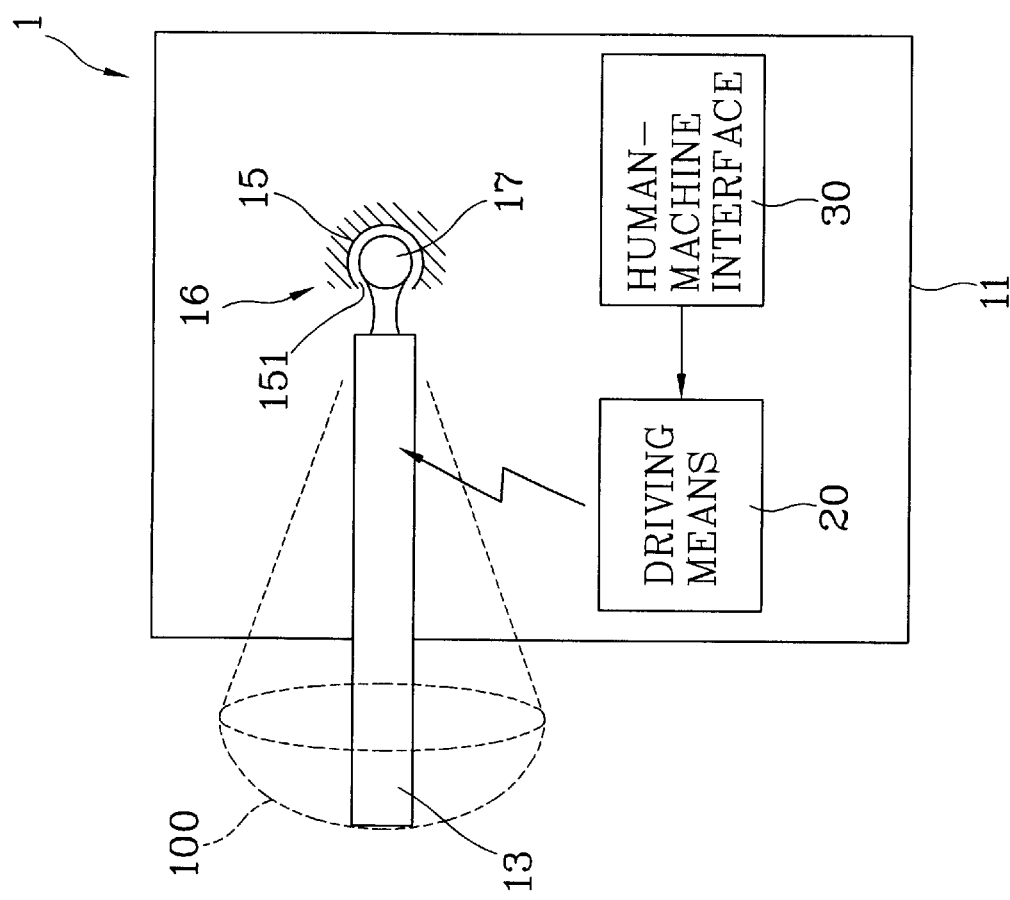
FIG. 1 is a schematic view of the preferred adjusting mechanism for the lens set of an imaging system in accordance with the present invention.

The adjusting mechanism for the lens set of an imaging system in accordance with the present invention is applied to digital photo-taking system, monitoring system, and the like for precisely adjusting the lens set thereon. Please refer to FIG. 1, the preferred embodiment 1 of the adjusting mechanism of the lens set for an imaging system comprises a pivoting means 16, a driving means 20 for controlling the lens set 13, and a human-machine interface 30 for controlling the driving means 20. By providing the pivoting means 16 as a rotation center of the lens set 13 and the driving means 20, the lens set 13 of the imaging system according to the present invention can generate a cone-shape accessible region 100, with the cone tip located at the pivoting means 16.

According to the invention, the pivoting means 16, which is connected to the anchoring end of the lens set 13 inside the imaging system 1 and provides three rotational degrees of freedom to the anchoring end, can be a ball joint, a universal joint, or any as the like. Preferably, shown in FIG. 1, the pivoting means 16 is a ball joint comprising a ball housing 15 fixedly located to the imaging system 1 and a ball-shape terminal 17, which is connected with the anchoring end of the lens set 13 through an aperture 151 on the ball housing 15 and is restricted and limited rotationable inside the ball housing 15.

In case that the pivoting means 16 is a universal joint (not shown in figures), one of the terminal of the universal joint is connected fixedly to the imaging system 1, and with the other terminal of the universal joint connected to the anchoring end of the lens set 13.

According to the present invention, the driving means 20 located inside the imaging system 1 is utilized to drive the lens set 13 rotating inside the cone-shape accessible region 100 with aforesaid pivoting means 16 as the rotation center. Preferably shown in FIG. 2, the first embodiment of the driving means 20 according to the present invention further comprises a first electromagnetic-controlled element 21 and a second electromagnetic-controlled element 22.

Figure 2:
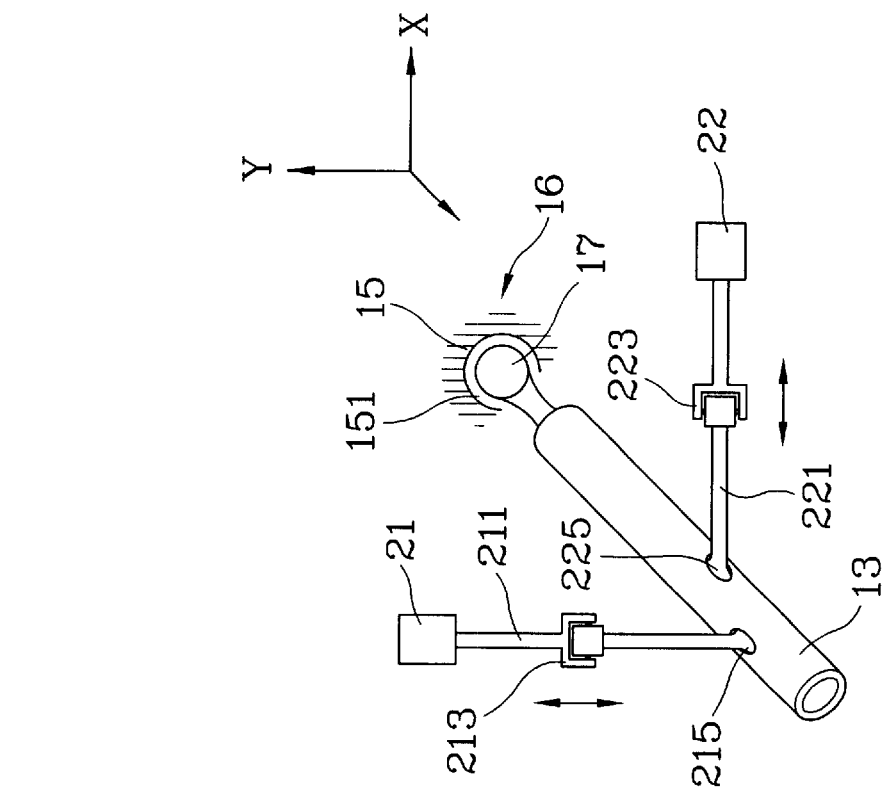
FIG. 2 is a schematic view of the first embodiment of the driving means of the preferred adjusting mechanism for the lens set of an imaging system in accordance with the present invention.

Illustrated in FIG. 2, the first connecting arm 211 of the first electromagnetic-controlled element 21 as the output of the first electromagnetic-controlled element 21, is a flexible arm with its protruding length controllable, and can be a two-section arm with two sections connected via a first universal joint 213 located in the middle of the arm 211. One end of the first connecting arm 211 is connected with the first electromagnetic-controlled element and with the other end connected to the middle of the lens set 13 via a first ball joint 215. By providing the first connecting arm 211, the lens set 13 can then be pulled or pushed by the first electromagnetic-controlled element 21.

Similar to the structure described in the first electromagnetic-controlled element 21, the second electromagnetic-controlled element 22 according to the present invention also has a two-section second connecting arm 221. The second connecting arm 221 has a second universal joint 223 in the middle, a second ball joint 225 as the connection to the lens set 13. Nevertheless, the installation of the second electromagnetic-controlled element 22 and the second connecting arm 221 is not parallel to, or along the same line with, the installation of the first electromagnetic-controlled element 21 and the first connecting arm 211. Such oblique arrangement of the first electromagnetic-controlled element 21 and the second electromagnetic-controlled element 22 make the lens set 13 both X-axis and Y-axis adjustable in the cone-shape accessible region 100, by the first electromagnetic-controlled element 21 and the second electromagnetic-controlled element 22 pushing or pulling the lens set 13.

Alternatively, according to the present invention, aforesaid the first ball joint 215 and the second ball joint 225 can be replaced with universal joints or any as the like. Similarly, the first universal joint 213 and the second universal joint 223 can be substituted by ball joints or the like.

Figure 3:
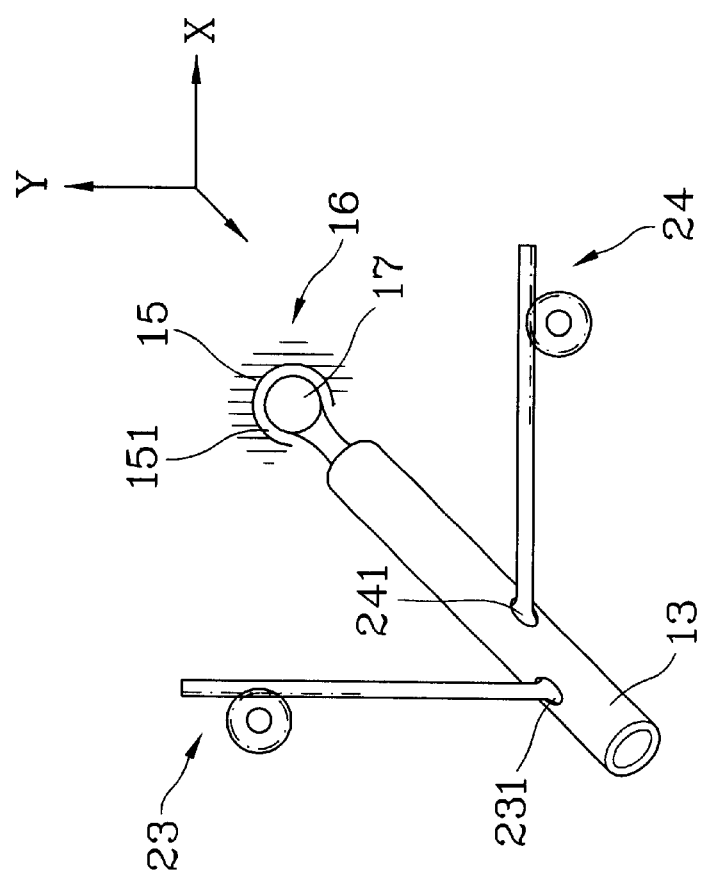
FIG. 3 is a schematic view of the second embodiment of the driving means of the preferred adjusting mechanism for the lens set of an imaging system in accordance with the present invention.

Referring now to FIG. 3, the second embodiment of the driving means 20 is shown. In this embodiment, the driving means 20 comprises a first gear-and-rack set 23 to replace the first electromagnetic-controlled element 21 of the first embodiment, and a second gear-and-rack set 24 to replace the second electromagnetic-controlled element 22 of the first embodiment. The gear of the first gear-and-rack set 23 is driven by an electrical motor in the imaging system 1, and the rack engaged with the gear is connected to middle of the lens set 13 by a third ball joint 231 located at the end of the rack.

Similar to the setup described in the first gear-and-rack set 23, the second gear-and-rack set 24 according to the second embodiment of the driving means 20 has a gear driven by another electrical motor and a rack engaged with the gear and ball jointed to middle of the lens set by a fourth ball joint 241 located at the end of the rack. However, the installation of the second gear-and-rack set 24 is not parallel to, or along the same line with, the installation of the first gear-and-rack set 23. Such oblique arrangement of the driving means 20 can make the lens set 13 X- and Y-axis adjustable in the cone-shape accessible region 100, by the first gear-and-rack set 23 and the second gear-and-rack set 24 pushing or pulling the lens set 13.

Alternatively, according to the present invention, aforesaid the third ball joint 231 and the fourth ball joint 241 can be replaced with universal joints or any as the like.

Figure 4:
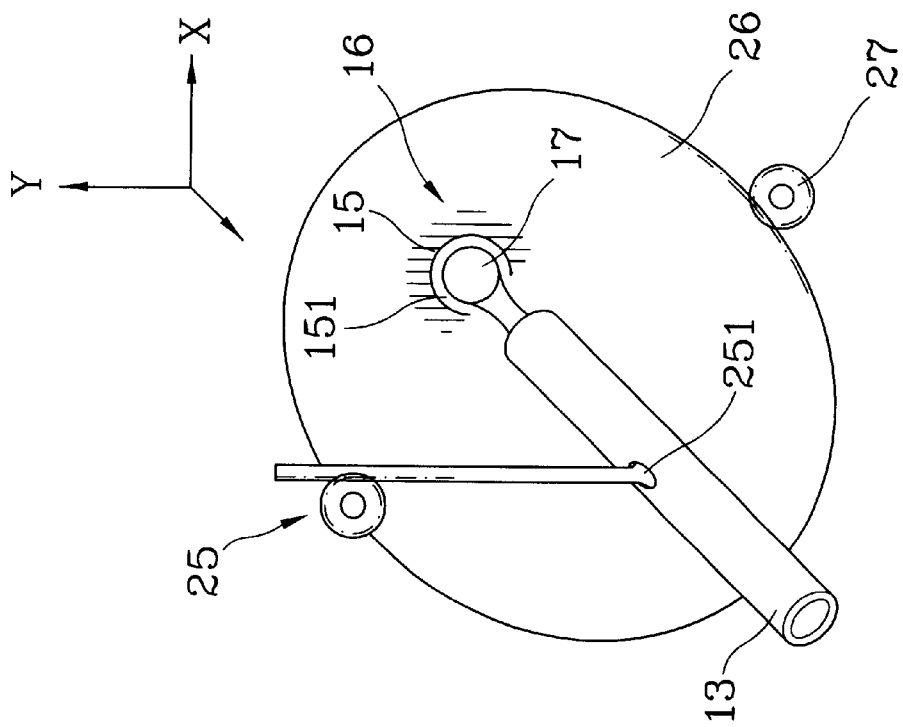
FIG. 4 is a schematic view of the third embodiment of the driving means of the preferred adjusting mechanism for the lens set of an imaging system in accordance with the present invention.

Referring now to FIG. 4, the third embodiment of the driving means 20 according to the present invention is illustrated. In the third embodiment, the driving means 20 comprises a carrier 26 and a third gear-and-rack set 25.

The carrier 26, which is driven by an electrical motor, is a rotational platform for bearing the pivoting means 16 and the third gear-and-rack set 25. The third gear-and-rack set 25 further comprises a gear driven by another motor and a rack engaged with the gear at one side and ball jointed to the middle of the lens set 13 at the other end with a fifth ball joint 251. The installation of the third gear-and-rack set 25 can't be perpendicular to the rotation axis of the carrier 26 to avoid dead-locking of the adjusting while pushing or pulling the lens set 13. Such arrangement of the driving means 20 makes the lens set 13 X- and Y-axis adjustable in the cone-shape accessible region 100, by rotating the carrier 26 and pulling/pushing from the third gear-and-rack set 25.

Alternatively, according to the present invention, aforesaid the fifth ball joint 251 can be replaced with a universal joint or any as the like.

The human-machine interface 30 according to the present invention is a means for facilitating the operator to control the driving means 20 indirectly. Preferably, shown in FIG. 5, the human-machine interface 30 is a displacement-sensing means installed in the imaging system 1, and further comprises a rotation ball 31 and a sensing unit. The rotation ball 31 is utilized to generated angular displacement by human activation. The sensing unit located around the rotation ball 31 is used for detecting the angular displacement of the rotation ball 31 and for providing a status signal to control the driving means 20, and further comprises preferably an X-axis sensor 32, a Y-axis sensor 33, and a reference sensor 34 for supplying reference status signal. According to the present invention, positions of the X-axis sensor 32, the Y-axis sensor 33, and the reference sensor 34 form a triangle shape, so that the angular displacement of the rotation ball 31 can be captured accurately and can be used easily to activate the driving means 20.

In the aforesaid embodiments of the adjusting mechanism of the lens set for an imaging system, the human-machine interface 30 is the common input device. It adapts the human movement, and have signals generated to adjust the lens set 13 in the cone-shape accessible region 100 via controlling the driving means 20. The movement of the driving means is carried out by a plurality of electrical motors. On the other hand, in another embodiment of the adjusting mechanism of the lens set for an imaging system according to the present invention, a hand control means can be used to replace aforesaid driving means 20 and human-machine interface 30 for controlling motion of the lens set 13, but the pivoting means 16 is remained in all the embodiments.

Figures 5, 6:
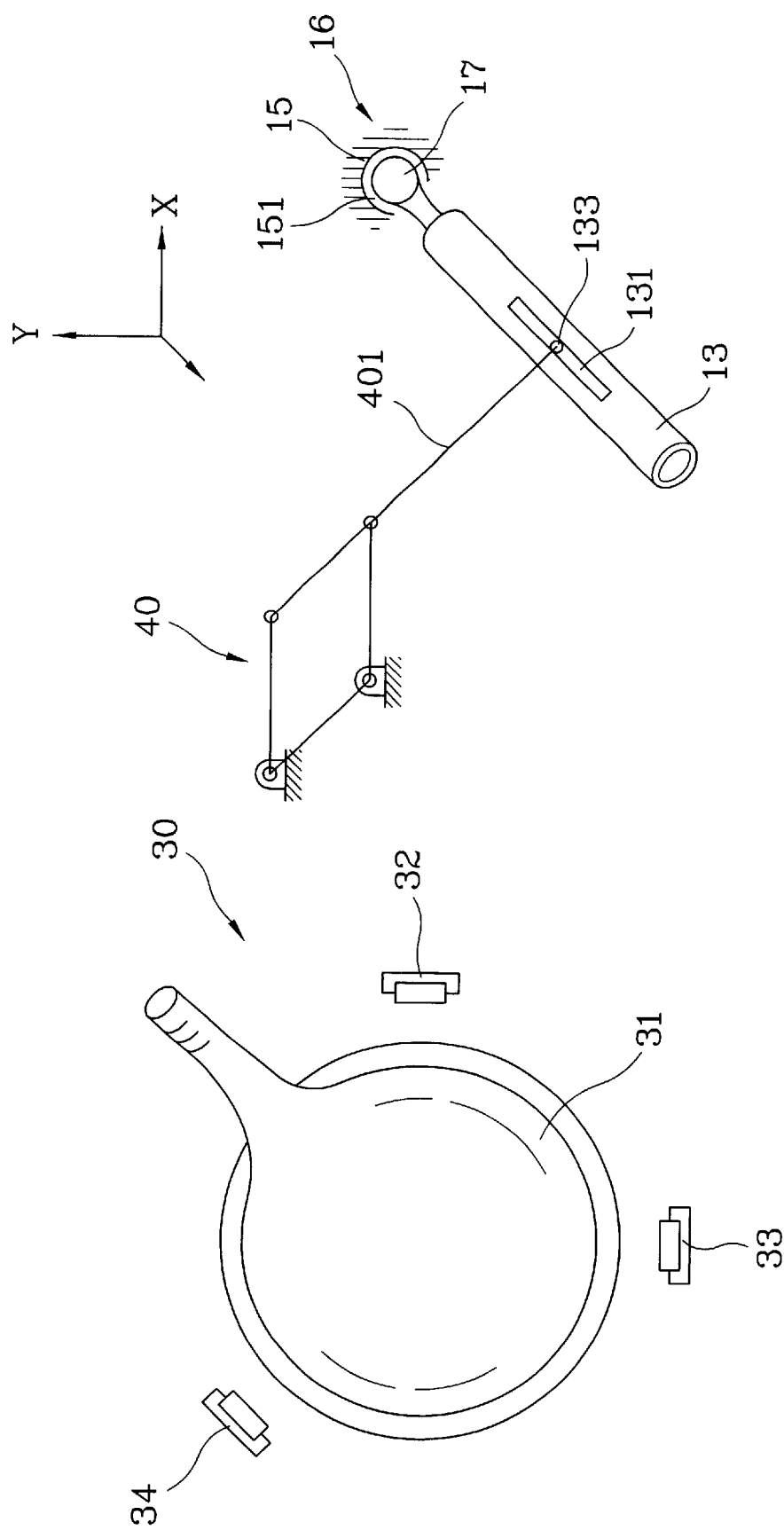
FIG. 5 is a schematic view of the preferred embodiment of the human-machine interface of the preferred adjusting mechanism for the lens set of an imaging system in accordance with the present invention.
FIG. 6 is a schematic view of another embodiment of the adjusting mechanism for the lens set of an imaging system in accordance with the present invention.

Referring now to FIG. 6, the hand control means 40 of the embodiment can be a four-bar linkage to control the positioning of the lens set 13 directly, and no need of any electrical motor in the present invention is necessary. The four-bar linkage can be an a planar rectangular linkage installed inside the imaging system 1, with the input bar accessible to the foreign control activation (hand motion, for example) and the extended output bar 401 connected with the lens set 13 via a sliding track means. The sliding track means comprises a slider 133 ball jointed to the output bar 401 of the four-bar linkage, and a track 131 located on the circumference of the lens set 13 along the longitudinal direction of the lens set 13 to accept the slider 133.

Preferably, the plane where the four-bar linkage locates is perpendicular to the center line of the cone-shape accessible region 100 of the lens set 13. By providing the four-bar linkage, the sliding track means at end of the output bar 401 and the pivoting means 20, the lens set 13 in accordance with 5 the present invention can be easily adjusted anywhere in the cone-shape accessible region 100 as the consequence of manual activation from the input bar of the four-bar linkage.

Alternatively, aforesaid ball joint between the slider 133 and the output bar 401 can be replaced with a universal joint or any as the like.

While the present invention has been particularly shown and described with reference to preferred embodiments, it will be understood by those skilled in the art that various changes in form and detail may be without departing from the spirit and scope of the present invention.

We claim:

1. An adjusting mechanism for the lens set of an imaging system, which is applied to digital photo-taking system, monitoring system, and the like for precisely adjusting the lens set thereon, comprising:

a pivoting means, located inside the imaging system, for providing rotation capability to the lens set having the rotation center located at the pivoting means and close to the anchoring end of the lens set;

a driving means, located inside the imaging system, for driving the lens set to rotate around the pivoting means; and a human-machine interface, which is a means for facilitating the operator to control the driving means indirectly;

wherein said pivoting means is a ball joint, further comprising a ball housing fixedly located to said imaging system and a ball-shape terminal which is confined rotationably inside said ball housing and is connected with said anchoring end of said lens set through an aperture on said ball housing.

2. The adjusting mechanism for the lens set of an imaging system according to claim 1, wherein said pivoting means is a universal joint, with one of the terminal which of connected fixedly to said imaging system and the other terminal which of connected with said anchoring end of said lens set.

3. The adjusting mechanism for the lens set of an imaging system according to claim 1, wherein said driving means further comprises:
   a first electromagnetic-controlled element, having a first connecting arm which of as the protruded length-controlled output connected with said lens set, where the first connecting arm is a two-section arm with two sections flexible jointed together by a first universal joint in the middle of said arm, having one end connected with said first electromagnetic-controlled element and with the other end flexible jointed to the middle of said lens set by a first ball joint; and
   a second electromagnetic-controlled element, having a second connecting arm which of as the protruded length-controlled output connected with said lens set, where the second connecting arm is a two-section arm with two sections flexible jointed together by a second universal joint in the middle of said arm, having one end connected with said second electromagnetic-controlled element and with the other end flexible jointed to the middle of said lens set by a second ball joint; and which the installation of said second electromagnetic-controlled element and said second connecting arm is not parallel to, or along the same line with, the installation of said first electromagnetic-controlled element and said first connecting arm.

4. The adjusting mechanism for the lens set of an imaging system according to claim 3, wherein said the first universal joint is replaced with a ball joint.

5. The adjusting mechanism for the lens set of an imaging system according to claim 3, wherein said the second universal joint is replaced with a ball joint.

6. The adjusting mechanism for the lens set of an imaging system according to claim 3, wherein said the first ball joint is replaced with a universal joint.

7. The adjusting mechanism for the lens set of an imaging system according to claim 3, wherein said the second ball joint is replaced with a universal joint.

8. The adjusting mechanism for the lens set of an imaging system according to claim 1, wherein said driving means further comprises:
   a first gear-and-rack set, comprising a gear and a rack; where the gear is driven by an electrical motor, and the rack engaged with the gear is ball jointed at one end which of to middle of the lens set; and
   a second gear-and-rack set, comprising a gear and a rack; where the gear is driven by an electrical motor, and the rack engaged with the gear is ball jointed at one end which of to middle of the lens set; and which the installation of said second gear-and-rack set is not parallel to, or along the same line with, the installation of said first gear-and-rack set.

9. The adjusting mechanism for the lens set of an imaging system according to claim 8, wherein said rack of said first gear-and-rack set is universally jointed at one end which of to middle of said lens set.

10. The adjusting mechanism for the lens set of an imaging system according to claim 8, wherein said rack of said second gear-and-rack set is universally jointed at one end which of to middle of said lens set.

11. The adjusting mechanism for the lens set of an imaging system according to claim 1, wherein said driving means further comprises:
   a carrier, which is a rotational platform driven by an electrical motor for bearing said pivoting means and the following third gear-and-rack set; and
   the third gear-and-rack set, comprising a gear and a rack; where the gear is driven by an electrical motor, and the rack engaged with the gear is ball jointed at one end which of to middle of the lens set; and which the installation of said third gear-and-rack set is not perpendicular to the rotation axis of the carrier.

12. The adjusting mechanism for the lens set of an imaging system according to claim 11, wherein said rack of said third gear-and-rack set is universally jointed at one end which of to middle of said lens set.

13. The adjusting mechanism for the lens set of an imaging system according to claim 1, wherein said human-machine interface is a means for facilitating the operator to control the driving means indirectly, further comprising a rotation ball and a sensing unit; where the rotation ball is utilized to generated angular displacement by human activation, and the sensing unit located around the rotation ball is used for detecting the angular displacement of the rotation ball and for providing a status signal to control said driving means.

14. The adjusting mechanism for the lens set of an imaging system according to claim 13, wherein said sensing unit further comprises an X-axis sensor, a Y-axis sensor, and a reference sensor for supplying reference status signal.

15. The adjusting mechanism for the lens set of an imaging system according to claim 14, wherein positions of said X-axis sensor, said Y-axis sensor, and said reference sensor form a triangle shape.

16. An adjusting mechanism for the lens set of an imaging system, which is applied to digital photo-taking system, monitoring system, and the like for precisely adjusting the lens set thereon, comprising:
   a pivoting means, located inside the imaging system, for providing rotation capability to the lens set having the rotation center located at the pivoting means and close to the anchoring end of the lens set; and
   a four-bar linkage for hand controlling the position of the lens set directly, which is an a planar rectangular linkage installed inside the imaging system, with the input bar accessible to the foreign control activation and the extended output bar connected with the lens set via a sliding track mean; which the sliding track means further comprises a slider ball jointed to the output bar of the four-bar linkage, and a track located on the circumference of the lens set and along the longitudinal direction of the lens set to accept the slider.

17. The adjusting mechanism for the lens set of an imaging system according to claim 16, wherein said pivoting means is a ball joint, further comprising a ball housing fixedly located to said imaging system and a ball-shape terminal which is confined rotationably inside said ball housing and is connected with said anchoring end of said lens set through an aperture on said ball housing.

18. The adjusting mechanism for the lens set of an imaging system according to claim 16, wherein said output bar of said four-bar linkage and said slider are connected by a ball joint.

19. The adjusting mechanism for the lens set of an imaging system according to claim 16, wherein said output bar of said four-bar linkage and said slider are connected by a universal joint.

* * * * *